United States Patent [19]
Rushton

[11] Patent Number: 5,412,780
[45] Date of Patent: May 2, 1995

[54] DATA STORAGE METHOD AND APPARATUS WITH ADAPTIVE BUFFER THRESHOLD CONTROL BASED UPON BUFFER'S WAITING TIME AND FILLING DEGREE OF PREVIOUS DATA TRANSFER

[75] Inventor: Nigel Rushton, Bristol, Great Britain

[73] Assignee: Hewlett-Packard Company, Palo Alto, Calif.

[21] Appl. No.: 873,426

[22] Filed: Apr. 27, 1992

[30] Foreign Application Priority Data

May 29, 1991 [GB] United Kingdom ............ 9111524

[51] Int. Cl.⁶ ............................................ G06F 13/00
[52] U.S. Cl. ............................ 395/250; 364/DIG. 1; 364/239; 364/239.1; 364/239.9
[58] Field of Search ........................ 395/250, 275; 364/239.1, 239.6

[56] References Cited

U.S. PATENT DOCUMENTS

| 4,839,791 | 6/1989 | Ito ........................... 395/250 |
| 4,860,193 | 8/1989 | Bentley et al. ............ 395/250 |
| 5,101,477 | 3/1992 | Casper et al. ............. 395/250 |
| 5,179,662 | 1/1993 | Corrigan et al. .......... 395/250 |
| 5,210,829 | 5/1993 | Bitner ....................... 395/250 |

FOREIGN PATENT DOCUMENTS

0247317A3 12/1987 European Pat. Off.
1575868 2/1978 United Kingdom.

Primary Examiner—Thomas C. Lee
Assistant Examiner—D. Dinh

[57] ABSTRACT

A data storage device for reading and/or writing data to a storage medium includes a buffer memory (15) for smoothing the flow of data to/from the storage medium. Activation of the storage apparatus (9) to read/write data from/to the storage medium is generally controlled in dependence upon the amount of data held in the buffer (13). In order to optimize utilization of the buffer (15), it is proposed to adaptively set the threshold level at which such activation is effected. To this end, the utilization of the buffer (13) during a previous activation is monitored and a new threshold value is set in dependence on the monitored utilization parameter.

8 Claims, 8 Drawing Sheets

DATA STORAGE METHOD AND APPARATUS WITH ADAPTIVE BUFFER THRESHOLD CONTROL BASED UPON BUFFER'S WAITING TIME AND FILLING DEGREE OF PREVIOUS DATA TRANSFER

The present invention relates to a method and apparatus for reading and/or writing data to a storage medium; in particular, but not exclusively, the invention relates to a method of reading/writing data from/to tape and to a streaming tape drive for implementing such method.

Data storage devices, such as tape drives, which involve the movement of a storage medium relative to a read/write head by an appropriate drive mechanism, operate most efficiently when data can be transferred to/from the storage medium in a continuous stream. Any interruption in the flow of data generally requires the current transfer operation to be halted and the storage medium repositioned by the drive mechanism before a new transfer operation can be initiated. When the transfer rate of data between a data storage device and an external system (host) is less than the normally-fixed rate at which data is transferred to/from the storage medium, then unless appropriate measures are taken, the transfer of data to/from the storage medium will be highly inefficient as the transfer process will have to halt continually to allow the host to catch up and this, in turn, will require frequent repositioning by the drive mechanism. To overcome this problem, it is well known to provide data buffers in storage devices so that during each transfer operation to/from the storage medium, a substantial amount of data can be transferred before having to wait for the host to catch up.

The capacity of such data buffers is not, of course, unlimited so that generally not all data of interest can be transferred in a single transfer operation with the storage medium.

In utilising the resource presented by a finite data buffer to best advantage, a number of conflicting considerations arise. If the sole consideration was to minimise the number of storage-medium transfer operations (minimising the wear on mechanical components of the drive mechanism involved in stopping, repositioning and restarting the storage medium), then this could be achieved simply by starting up the drive mechanism only when the data buffer was empty, in the case of data reading, or full, in the case of data writing. However, it is also generally of importance to minimise the time the host has to wait before it can transfer data to/from the storage device; if the drive mechanism of the device is not started until the data buffer is fully ready, then the inherent start-up delay before data transfer to/from the storage medium can take place, is effectively wasted time so far as the host is concerned as it can do nothing during this period.

To deal with these conflicting considerations, it is known to monitor the current amount of free space in the buffer during data writing, or the current amount of buffer memory yet to be read out to the host during data reading, and when this amount falls below a predetermined, fixed threshold value, to instigate a storage-medium transfer operation by starting up the drive mechanism. The threshold value is chosen such that at least during part of the start-up phase of its drive mechanism, the host can continue to operate whilst at the same time ensuring, as far as possible, that when the storage medium transfer operation is ready to commence, the data buffer is fully ready.

A complication here is that data transfer to/from the storage medium normally takes place in blocks of data of fixed size, whilst the transfer of data to/from the storage device normally takes place in blocks of different, and often variable size. Until an entire block is written to the buffer, it is not available for transfer out; conversely, until an entire block has been transferred out of the buffer, none of the space it occupies can be considered free.

Ideally, during data writing, instigation of a transfer operation by starting-up the storage-medium drive mechanism, is effected at a point in time such that the data buffer becomes full just as the process of transferring a first block from the buffer to the storage medium is complete. Similarly, during data reading, instigation of a transfer operation by starting-up the storage-medium drive mechanism, is effected at a point in time such that the data buffer becomes empty just as the process of transferring a first block from the storage medium to the buffer is complete.

The use of a fixed threshold value for instigating a storage-medium transfer operation is not satisfactory in practice as it does not allow the above-described ideal situation to be achieved, not least because the rate at which data is transferred to/from the host is generally variable whilst the threshold will have been set taking into account only one specific host transfer rate.

It is an object of the invention to provide a data storage method and apparatus in which buffer utilisation is improved.

SUMMARY OF THE INVENTION

According to one aspect of the present invention, there is provided a data storage method for reading and/or writing data to/from a storage medium using data storage apparatus that includes a buffer memory, said method comprising the steps of:
a) transferring data to/from said storage apparatus,
b) storing data in said buffer memory, and
c) transferring data between said buffer memory and said storage medium in successive transfer operations each of which comprises a preparatory phase setting up conditions for data transfer, and a transfer phase in which data is transferred substantially continuously, the ordering of steps (a), Co) and (c) for any given item of data and the direction of data transfer, being dependent on whether data is being written to, or read from, the storage medium; each transfer operation of step (c) being instigated upon the amount of buffer memory ready to partake in the transfer process of step (a) (hereinafter referred to as the "externally-useful memory amount") falling below a threshold value, said externally-useful memory amount being, for data writing, the amount of buffer memory free to receive data, and for data reading, the amount of buffer memory with data to be transferred from the apparatus; characterised in that said threshold value governing the next instigation of a step (c) transfer operation is adaptively determined in dependence on the utilisation of the buffer memory during a previously initiated step (c) transfer operation.

Thus, in the method of the present invention, parameters of buffer utilisation in earlier storage-medium transfer operations are used to determine the current threshold value. This approach whilst not being a direct measure of the transfer rate to/from the apparatus, offers a relatively simple implementation as compared to one in which the transfer rate is directly measured and immediately used to determine an ideal threshold. Whilst the approach adopted by the present invention, could at first sight lead to anomalous values of threshold if the external transfer rate should change significantly between successive transfer operations, in practice such changes are rare and will in any case be quickly assimilated.

Advantageously, said threshold value is adaptively determined to minimise the time, hereinafter called the waiting time, during which said externally-useful memory amount is substantially zero whereby to maximise the data transfer rate to/from said apparatus; the determination of said threshold value including the steps of measuring said waiting time during a said previously initiated step (c) transfer operation and utilising this measurement in deriving the threshold value. Where the transfer of data to/from the storage medium is effected in whole blocks, said waiting time is preferably measured as the time between said externally-useful memory amount becoming substantially zero and the time when a newly initiated step (c) transfer operation has transferred a first said block thereby increasing said externally-useful memory amount.

Advantageously, said threshold value is adaptively determined to minimise the remaining said externally-useful memory amount present when, following instigation of a step (c) transfer operation, this operation is first about to result in an increase in said externally-useful memory amount, whereby to minimise the number of step (c) transfer operations; the determination of said threshold value including the steps of measuring said remaining externally-useful memory amount during a said previously initiated step (c) transfer operation, and utilising this measurement in deriving said threshold value. Where the transfer of data to/from the storage medium is in whole blocks, said remaining externally-useful memory amount is preferably measured as said previously initiated step (c) transfer operation is just completing transfer of a first said block.

Advantageously, the same control function is used to determine said threshold value whether this determination is effected utilising the measured said waiting time or the measured said remaining externally-useful memory amount, one of these measured quantities being combined with a measurement of the mean data transfer rate achieved in step (a) to provide a quantity with the same dimensional units as the other measured quantity.

Preferably, said control function is of the form $$M(th) = M(start) - K E$$

where:
M (th) = the threshold value expressed in terms of said externally-useful memory amount;
M (start) = the value of said externally-useful memory amount at instigation of said step (c),
K = a constant
E = the said measured waiting time expressed as a negative value, or the said measured remaining externally-useful memory amount, as appropriate.

Advantageously, said control function further includes a constant added to the value M(start) in order to bias operation towards minimising said waiting time or subtracted in order to bias operation towards minimizing the number of storage-medium transfer operations.

According to a further aspect of the present invention, there is provided data storage apparatus for reading and/or writing data from/to a storage medium, said apparatus comprising:
  a buffer memory;
  external interface means for transferring data between the buffer memory and externally of said apparatus;
  storage media transfer means for transferring data between the buffer memory and the storage medium in successive transfer operations each of which comprises a preparatory phase in which the transfer means is set up for data transfer, and a transfer phase in which data is transferred substantially continuously; and
  control means for orchestrating the operation of the interface means, the buffer memory, and the transfer means to read and/or write data to said storage medium with the order in which any given item of data is passed through said interface means, buffer memory and transfer means being dependent on whether data is being written to, or read from, said storage medium;

the control means instigating a transfer operation by said storage-media transfer means upon the amount of buffer memory ready to partake in data transfer by said external interface (hereinafter referred to as the "externally-useful memory amount") falling below a threshold value, said externally-useful memory amount being, for data writing, the amount of buffer memory free to receive data, and for data reading, the amount of buffer memory with data to be transferred from the storage apparatus; characterised in that said control means includes threshold determining means operative to adaptively determine the value of said threshold to be used in instigating the next transfer operation of said transfer means, in dependence on the utilisation of said buffer memory during a previously initiated transfer operation of said transfer means.

The method and apparatus of the invention can advantageously be applied to sequential-access data storage devices such as tape drives.

DESCRIPTION OF THE PREFERRED EMBODIMENT

A data storage method according to the invention, and a streaming tape drive embodying the invention, will now be particularly described, by way of non-limiting example, with reference to the accompanying diagrammatic drawings, in which.

Figure 1:
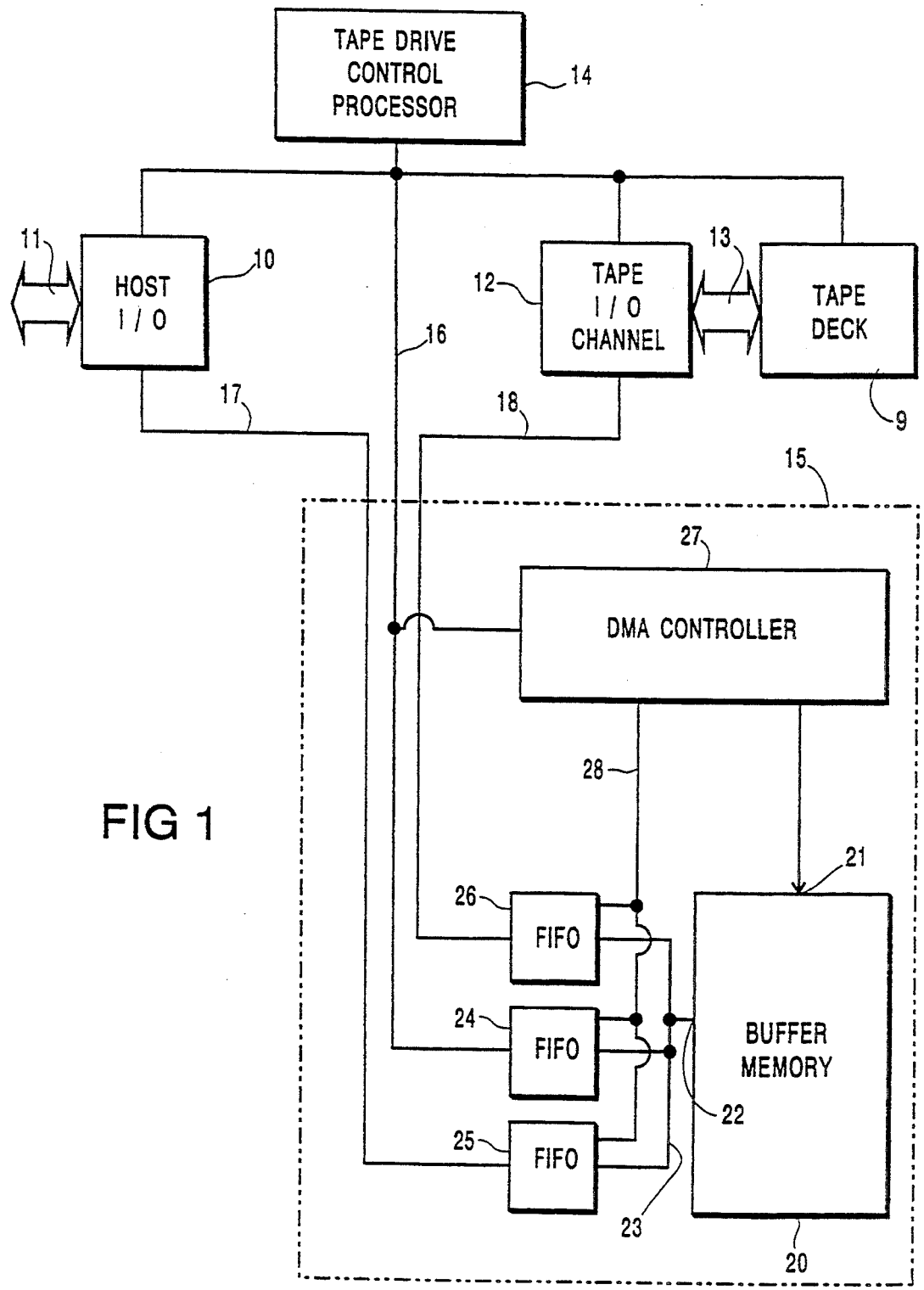
FIG. 1 is a block diagram of the streaming tape drive.

The streaming tape drive shown in FIG. 1 is intended to store to tape data provided by a data handling system (in the present case, a host computer) and to retrieve this data from tape and transfer it back to the host when requested to do so. The host computer (not shown) is connected to an input/output interface 10 of the tape drive by a bus system 11 and communications over this system will generally take place in accordance with a standard protocol such as the SCSI protocol with the protocol interactions over the bus system 11 being handled by the input/output interface 10.

The tape drive further comprises a tape deck 9 (including a tape transport mechanism and tape read/write heads), a tape input/output (I/O) channel 12 connected by a bus 13 to the deck 9 and operative to process and format signals supplied to/coming from the deck 9, and a buffer memory subsystem 15 for buffering the flow of data between the interface 10 and the tape I/O channel 12, and a control processor 14 for orchestrating the overall data transfer process and carrying out certain processing on data held in the buffer memory subsystem 15. The interface 10 and the tape I/O channel 12 are connected to the buffer memory subsystem 15 through bus systems 17 and 18 respectively whilst the control processor 14 effects control over the other elements of the drive through a bus system 16 that is also used by the control processor 14 to transfer data between itself and the buffer memory sub system 15 for the purpose of processing this data. The control processor 14 is further arranged to exchange control signals with the host through the interface 10. The control processor 14 comprises for example, a microprocessor, ROM memory storing control programs, and a RAM memory.

During data storage, the control processor 14 controls the input of data into the buffer memory subsystem 15 from the host via the bus system 11, the interface 10 and the bus system 17, and the subsequent transfer of data from the buffer memory to the tape deck 9 via the bus system 18, the tape I/O channel 12 and the bus system 13. The buffer memory subsystem 15 permits the differing data rates and formats of the host system and tape deck 9 to be matched to one another. The control processor 14 may also perform a reformatting function between the reading in of data into the buffer memory subsystem 15 and the reading out of data to the tape deck 9.

During data read back, the control processor 14 oversees the reading in of data from the tape deck 9 into the buffer memory subsystem 15 via the bus system 13, the tape I/O channel 12 and the bus system 18, and the subsequent reading out of that data from the buffer memory subsystem 15 to the host computer via the bus system 17, the interface 10 and the bus system 11. In addition, the control processor 14 may effect a reverse formatting of the data held in the buffer memory subsystem 15 to that which was implemented during data storage.

Overall control of the transfer of data between the host and the buffer memory subsystem 15 is effected by a first transfer control process run by the control processor 14 whilst overall control of the transfer of data between the buffer memory subsystem and tape is effected by a second transfer control process run by the control processor, this processor being capable of running both processes concurrently.

Tape drives operating in the above described manner are well known in the art and more detailed description of the implementation of the illustrated arrangement will not therefore be given herein except briefly with regard to the buffer memory subsystem 15.

The buffer memory subsystem 15 shown in FIG. 1 includes a block of buffer memory 20 constituted, for example, by a plurality of dynamic RAM chips (not shown individually). The buffer memory has an address port 21 and a data port 22, the latter being connected to a buffer-memory data bus 23. The data buses of the bus systems 16, 17 and 18 are connected to the buffer-memory data bus 23 via respective FIFOs (first-in, first-out stores) 24, 25 and 26.

The address port 21 of the buffer memory 20 is connected to a DMA (Direct Memory Access) controller 27 of the buffer-memory subsystem 15. The control-processor bus 16 is connected to the DMA controller 17 to enable the control processor 14 to set up DMA transfers between the buffer memory 20 and the three data channels constituted by the bus systems 16, 17 and 18. The DMA controller 27 is arranged to select a particular data channel by means of control signals output via lines 28 to the FIFOS 24, 25 and 26, the latter being selectively connected to the buffer-memory data bus 23 under the control of these control signals. As is more fully described in our copending European Patent Application 0 365 116.A, the DMA controller 27 operates in a fixed, relatively short, service cycle to service each of the three data channels; this service cycle, together with the provision of the FIFOS 24,25 and 26 effectively provides for concurrent access to the buffer memory 20 by all three data channels.

Figure 2:
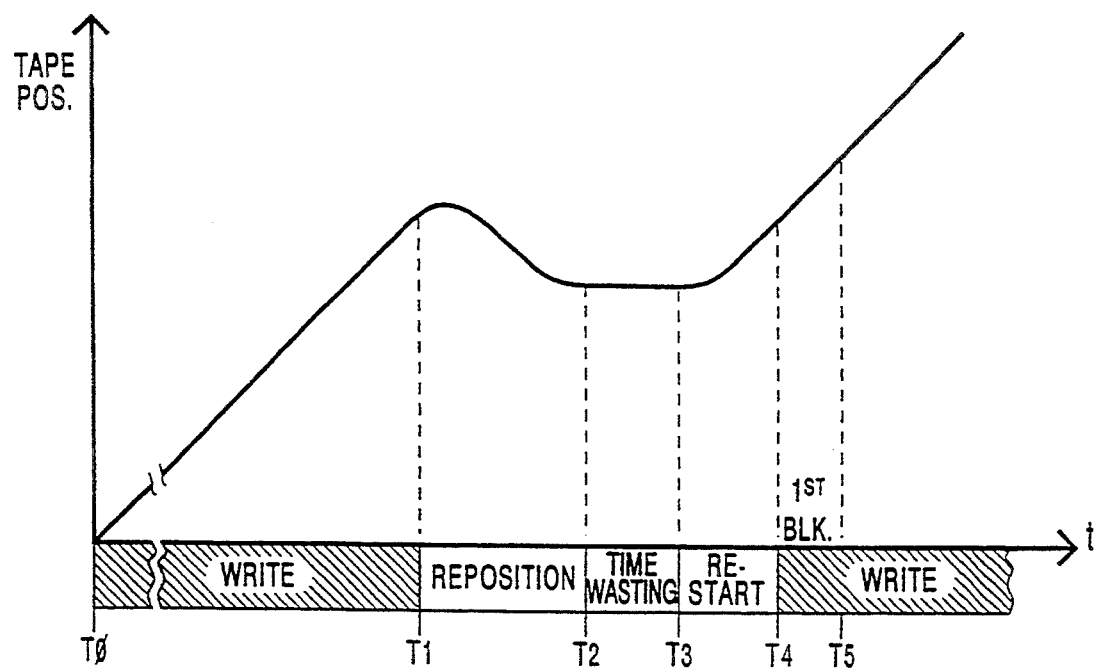
FIG. 2 is a time plot of tape position during a data writing phase in which the tape drive temporarily drops out of streaming and 'time wastes' by stopping.

Turning now to a consideration of how best to utilise the buffer memory 20 to minimise wear on the tape deck 9 whilst also minimising a time the host has to await service, reference is first had to FIG. 2 which is a time plot showing tape position during a period of data writing. The tape deck 9 is arranged to write data to tapes at a substantially constant transfer rate. If for any reason, there should be an interruption in the flow of data provided to the tape deck for writing, then the current writing operation is terminated and the tape is subsequently repositioned to enable a new writing operation to be initiated at a location on the tape substantially where the previous writing operation was discontinued. Thus, in FIG. 2, during a time period T0 to T1 data is being continuously written to tape and the tape is being continuously advanced past the right head of the tape deck 9. At time T1 data ceases to be available for writing; since data writing is effected in blocks of fixed size it will generally be that a whole block is not available for writing although some data may be present in the buffer memory 20 waiting to be written to tape. The current data writing operation is therefore terminated and the tape is partially rewound to a position from which it can be restarted and brought up to writing speed just at a point in time when the last data written passes the write head so that new data will be written substantially contiguously on the tape with the previous data. This repositioning of the tape takes place during time period T1 to T2. The tape deck 9 now waits for a period until there is sufficient data available to make it worthwhile restarting the tape deck; this idle period T2 to T3 is known as "timewasting". In due course the control processor 14 will instigate a new writing operation and the tape deck 9 will restart during a restart period T3 to T4, the tape deck accelerates the tape up to writing speed and depending on the type of tape deck, will gain synchronisation with the previously written data. At time T4 the tape is moving at writing speed and the last data written has just passed the write head so that a new write operation can be commenced. As already noted, data is written to the tape in blocks and at time T5 a first block has been written to tape. This is an important timing point because it is at this stage that an amount of memory corresponding to the block size is released in the buffer memory 20 (this memory could not be released earlier as writing of the block may not have been successfully completed).

The present invention is concerned with optimising the point in time T3 when a new tape transfer operation (data writing/reading) is initiated.

Figure 3A:
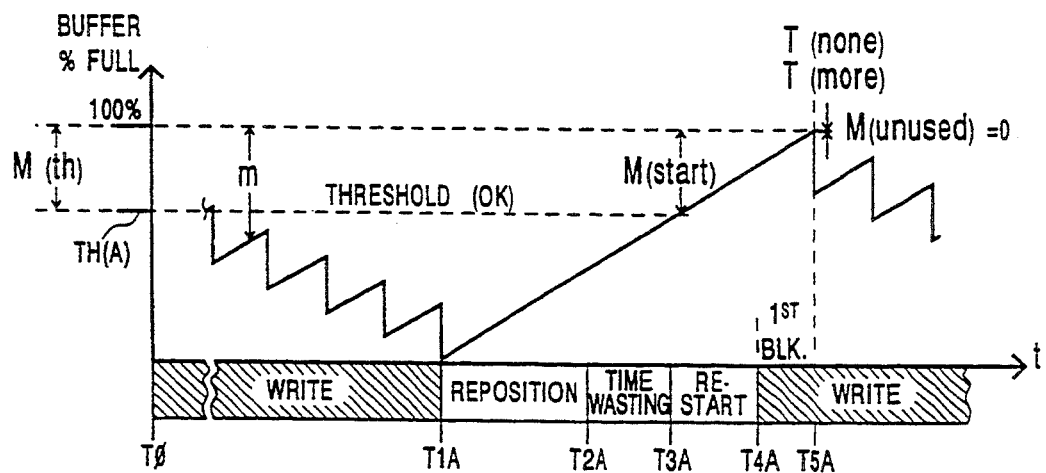
FIG. 3A is a time plot showing the state of a data buffer of the tape drive during the period covered by FIG. 2, this being for a first value of buffer threshold that determines when a tape deck of the drive is restarted for data writing.

Turning next FIGS. 3A to 3D, these figures show the state of the buffer memory 20 during the termination of one writing operation and the instigation of a subsequent write operation, the different figures showing the effect of instigating a new write operation at different times. Considering first FIG. 3A in general terms, the various stages involved during the termination of one write operation and the start of another, that are depicted by the stage bar underneath the time axis in FIG. 2 have been repeated under the time axis in FIG. 3A. During a period of writing data to tape (period T0 to T1a and period T4a to T5a), memory is freed up in the buffer memory 20 in blocks as already described and this is illustrated in FIG. 3A by decreasing steps in the amount of buffer memory currently filled. At the same time as the buffer memory is being emptied in these steps, data is still being supplied into the buffer memory from the host and this transfer is shown as an upward ramp the stroke of which represents the mean transfer rate of data from the host to the tape drive. Although in practice the transfer from the host to the tape drive will generally occur in blocks of possibly variable size, these blocks are generally smaller than those in which data is transferred to tape; in order to clearly distinguish between the effect of data transfers with the host from data transfers with the tape, on the overall state of fullness of the buffer memory 20, the data transfers with the host have, in the present specification, been illustrated as continuous functions rather than as stepped ones.

It should also be noted that in the following description it is generally assumed that the data transfer rate with the host is less than that with the tape since it is only during these circumstances that the problem of optimising use of the buffer memory arises. If the data transfer rate with the host is greater than that with the tape, then the tape deck 9 is simply continuously operated to write/read data as necessary and the host must wait at intervals for the data transfer with tape to catch up.

Considering again FIG. 3A, during period T0 to T1A, the occupancy of the buffer memory 20 decreases progressively until such a time that a whole block of data is not available for the tape deck 9 to write to tape; at this time T1A, the current write operation is stopped. Thereafter the occupancy of the buffer memory 20 increases steadily as the host supplies data to the tape drive. At time T3A, a new write operation is instigated but it is not until time T5A that this has an effect of bringing up a space within the buffer memory 20. Ideally, and as shown in FIG. 3A, the point in time T5A when the newly instigated write operation first completes transfer of a block to the tape, corresponds to the time at which the buffer memory would otherwise have become full as a result of data transfer from the host. This timing is ideal because it means that the host can continue to transfer data without having wasted any time waiting for the tape drive to free up the memory, whilst at the same time, there is a maximum amount of data for the tape deck to write to tape during each write operation so that the number of such operations is minimised thereby minimising wear on the tape deck.

Instigation of the new write operation at time T3 was effected when a memory level threshold TH(A) was crossed and in the particular example illustrated in FIG. 3A the level of this threshold was such that it had been an ideal operation.

Figure 3B:
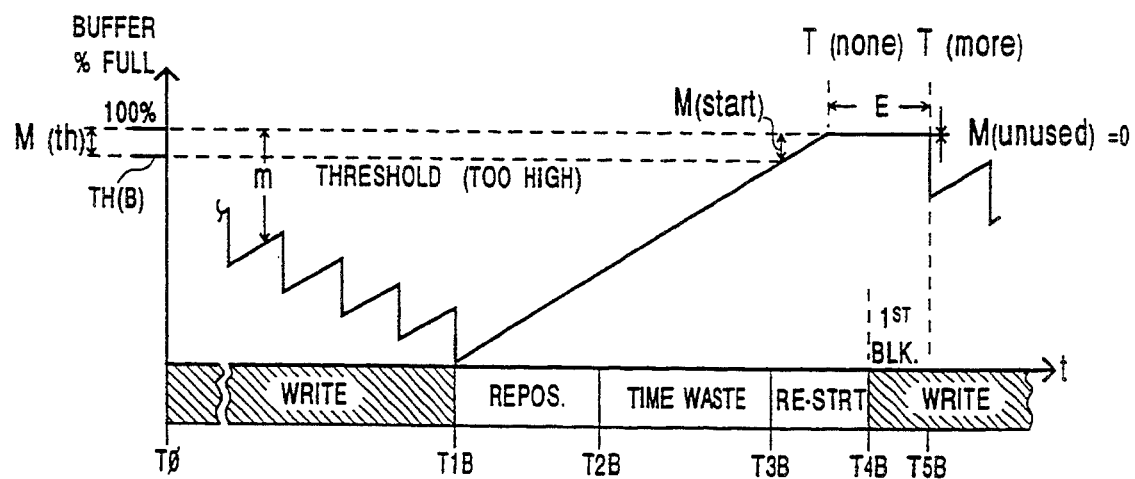
FIG. 3B is a diagram similar to that in FIG. 3A but for a second value of write-restart threshold.

FIG. 3B shows a situation similar to that of FIG. 3A but in this case the memory threshold level TH(B) has been set too high so that instigation of the new write operation at time 3B takes place too late. As a result, the buffer memory 20 becomes full before the tape deck 9 has even commenced writing at time T4B; as a result, the host is forced to wait until time T5B when the newly instigated write operation first frees up a block of memory.

Figure 3C:
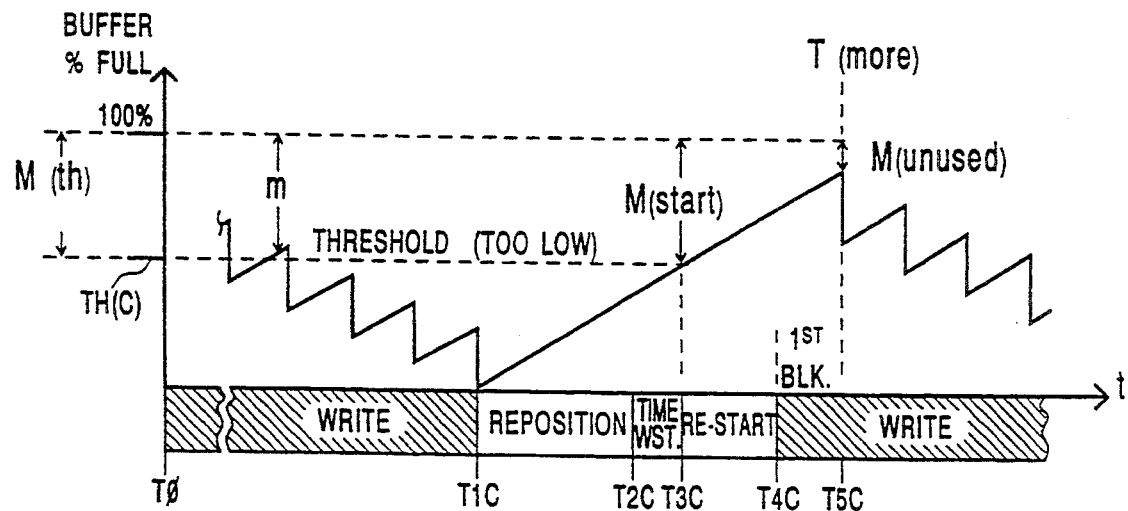
FIG. 3C is a diagram similar to that of FIG. 3A but for a third value of write-restart threshold.

FIG. 3C shows a situation in which the threshold TH(C) has been set too low so that the new write operation is instigated at time T3 which is too early. As a result, the tape deck 9 finishes transferring a first block at time T5C which is well before the buffer memory has been filled by the host. The consequence of this is that there is less data for the tape deck 9 to store to tape during each write operation so that it must effect more such operations than necessary.

Figure 3D:
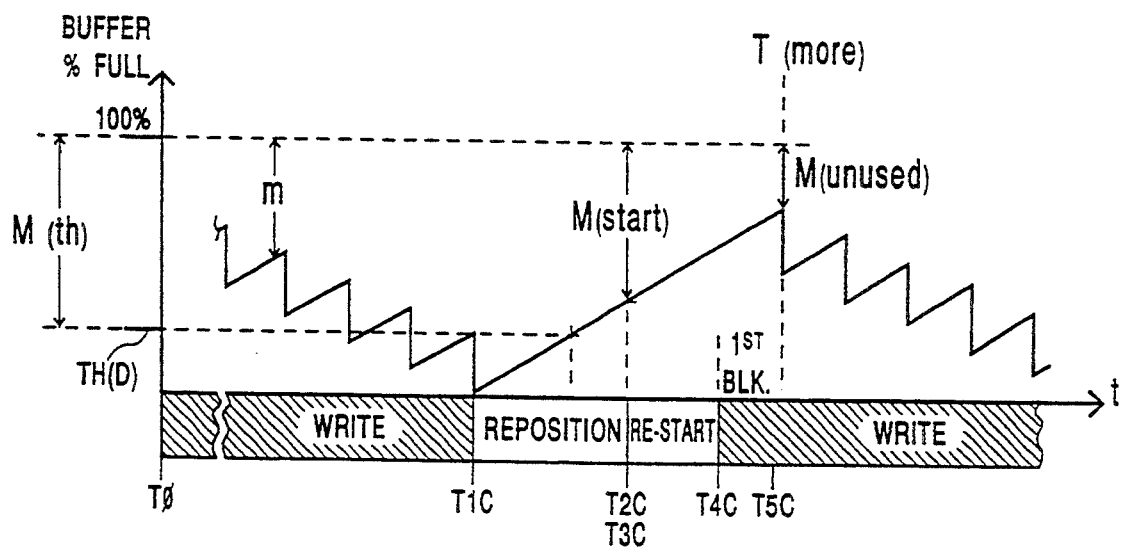
FIG. 3D is a diagram similar to that of FIG. 3A but for a fourth value of write-restart threshold.

FIG. 3D shows a situation where the threshold TH(D) has been set at an even lower level than in FIG. 3C so that according to the threshold, a new write operation should be instigated whilst the tape is still being positioned during the period T1C to T2C. Obviously it is not possible to instigate a new write operation during this repositioning period and therefore instigation of a new write operation is deferred until repositioning has been completed.

In accordance with the present invention, the level of the memory threshold at which a new write operation is instigated is not set at one predetermined fixed level but is adaptively set in dependence on the utilisation of the buffer memory during a previously initiated write operation. The memory utilisation parameters that, in the present embodiment of the invention, are used to effect this adaptive determination are:

m—the amount of memory ready to partake in transfers with the host, hereinafter referred to as the "externally-useful memory amount"; for data writing this amount is the amount of free memory whilst for data reading this amount is the amount of memory with data ready to be transferred out to the host;

t—time.

In the following description, specific values of the above parameters are capitalised.

With reference to the externally-useful memory amount m, it may be noted that this amount is applied on the host's side of any processing that may be done on data by the control processor 14 so that whether or not any such processing takes place is not relevant to the threshold setting method described below.

The specific values of the parameters m and t of interest for the threshold setting process are as follows:

M(th)—the current threshold value expressed in terms of the foresaid externally-useful memory amount (see FIGS. 3A to 3D);

M(start)—the value of the externally-useful memory amount m at point in time that a new write operation is instigated; this will, of course, normally be the same as M(th) but for the case illustrated in FIGS. 3D where instigation of a new write operation has to be delayed, M(start) will differ from M(th).

M(unused)—this is the value of the externally-useful memory amount at the point in time T5 when a newly instigated write operation has first completed transfer of a block; for the cases shown in FIG. 3A and FIG. 3B, M(unused) will be zero whereas from the cases illustrated in FIGS. 3C and 3D M(unused) will have a non-zero value.

T(none)—this is the point in time when the externally-useful memory amount falls to zero (see FIGS. 3A and 3B).

T(more)—this is a point in time T5 when an amount of memory is first freed up by a newly instigated write operation.

Figure 4:
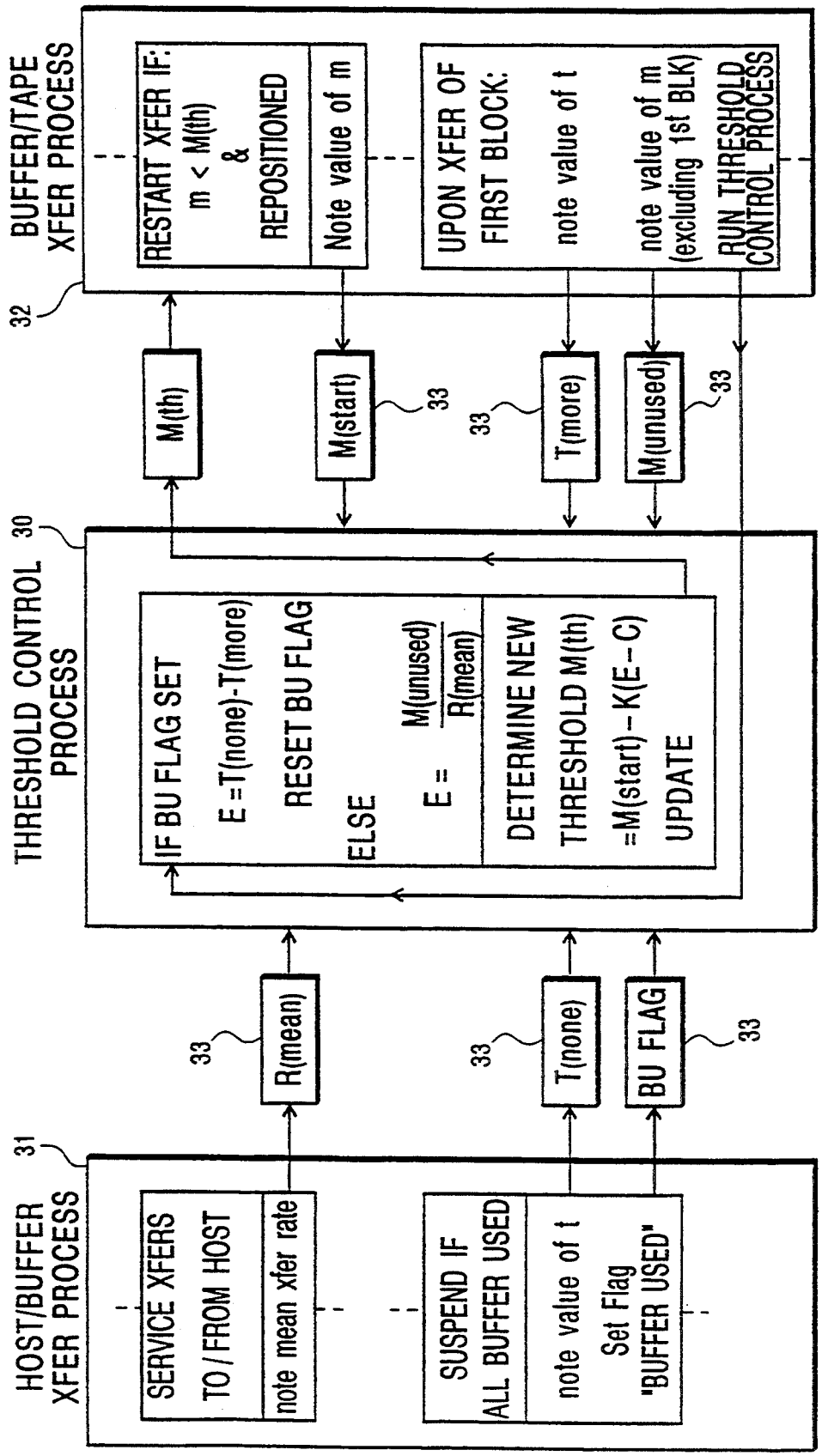
FIG. 4 is a diagram illustrating a threshold control process executed by a main control processor of the tape drive.

The process for adaptively determining the threshold M(th) is executed by the control processor 14 following completion of the initial phases of each tape transfer operation (that is after a time T5). FIG. 4 illustrates this threshold control process 30 and also illustrates how the host/buffer transfer process 31 and the buffer/tape transfer process 32 run by the processor 14 operate to provide buffer utilisation parameter values to the threshold control process 30. Only those portions of the host/buffer transfer process 31 and the buffer/tape transfer process 32 relevant to the adaptive control of the threshold M(th) have been shown in FIG. 4 since these processes are otherwise of standard form well known in the art. The processes 30, 31 and 32 work together through the storage of relevant parameter values in respective predetermined memory locations generally referenced 33 in FIG. 4.

In operation, the buffer/tape transfer process 32 is operative to instigate a new transfer process to/from the tape whenever the current value of the externally-useful memory amount m falls below the threshold value M(th) and the tape repositioning phase period (T1 to T2) has been completed. Upon initiation of a new transfer operation, the process 32 notes the value of m and stores it as the parameter value M(start). In due course the transfer process will be initiated at time T4 and a first block will be transferred between the tape and the buffer memory. At this point (time T5) the process 32 notes the value of t and stores it as the parameter value T(more); the value of m is also noted by the process 32 and stored as the parameter value M(unused), this being the value of m excluding any increase in the value of m due to transfer of the first block. The process 32 then signals to the control processor 14 that the threshold control 30 can now be run.

Whilst the buffer/tape transfer process 32 has been running, the host/buffer transfer process 31 has also been executing to service transfers to/from the host. During execution, the process 31 continually measures the rate of data transfer between the host and the tape drive and stores the measured value as a quantity R(mean); the transfer rate is simply measured by noting how much data has been sent/received during a fixed time interval. If at any stage during the host/buffer transfer operation the value of m should fall to zero (that is during data writing the buffer becomes full or, during data reading, there is no data available to be passed to the host), then the process 31 suspends the transfer operation by sending a "wait" signal to the host. The value of t at this time is stored as the value T(none). A flag (called the "Buffer Use" or "BU" flag in FIG. 4) is also set by the process 31.

Turning now to consideration of the threshold control process 30, upon initiation this process first calculates an error value E giving a measure of how far from ideal is the current setting of the threshold M(th). How this value E is calculated depends on whether the current threshold is too high or too low. If the BU flag has been set by the process 31 then E is calculated by subtracting the value T(more) from the value T(none) giving a negative value for E; thereafter the BU flag is reset. On the otherhand if the BU flag was not set by the process 31 E is calculated by dividing the value M(unused) by the value R(mean). Thereafter the process 30 proceeds to determine a new threshold value M(th) according to the formula:

$$M(th) = M(start) - K(E - C)$$

where K and C are constants.

The constant K determines the rate at which the threshold M(th) approaches the value that from the measurements made appears ideal. For reasons of stability K preferably has a value of the order of 0.5. The constant C effectively serves to bias the threshold in the direction such that any departure from ideal operation is likely err in favour of minimising the host waiting time at the expense of possibly increasing the number of tape transfer operations required.

Finally, the process 30 updates the value of M(th) held in memory 33; this new value is therefore available to the buffer/tape transfer process 32 in its next determination of when to instigate a new transfer operation.

It will be appreciated that the division of functionality between the processes 30, 31 and 32 may differ from that shown in FIG. 4; thus for example, the process 30 could be entirely incorporated in the process 32.

The above described threshold control process enables the value of the threshold M(th) to be adaptively modified during data writing to approach the ideal situation illustrated in FIG. 3A. As will be seen below the same threshold control process is effective to adaptively modify the corresponding threshold used to initiate a new data reading operation during transfer of data from tape to the host.

Figure 5:
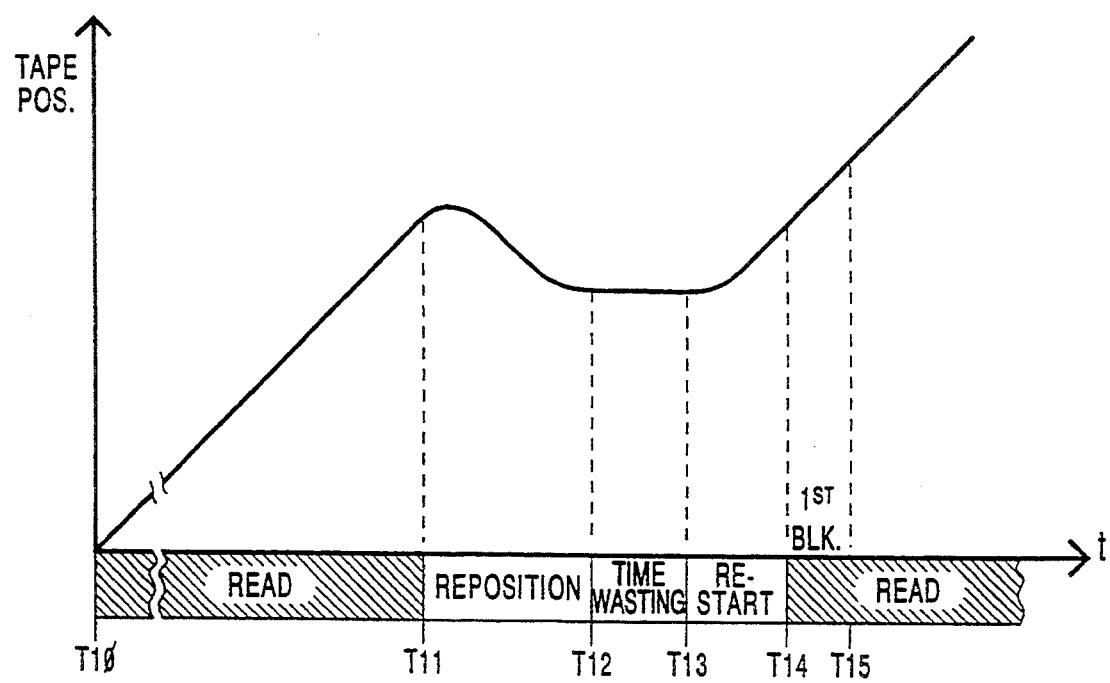
FIG. 5 is a time plot of tape position during a data reading phase in which the tape drive temporarily drops out of streaming and 'time wastes' by stopping.
Figure 6A:
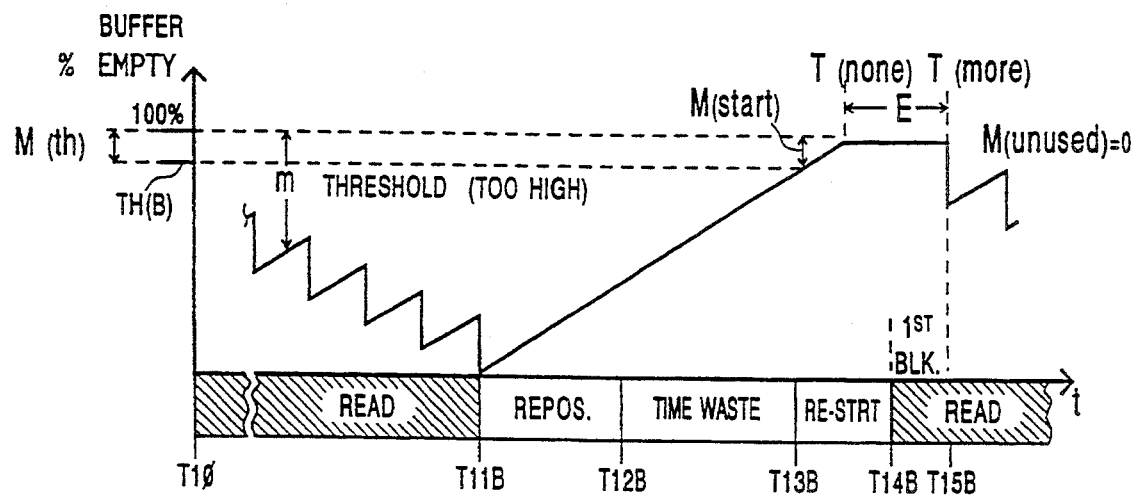
FIG. 6A is a time plot showing the state of the tape-drive buffer during the period covered by FIG. 5, this plot being for a first value of buffer threshold that determines when the tape deck is restarted for data reading.
Figure 6B:
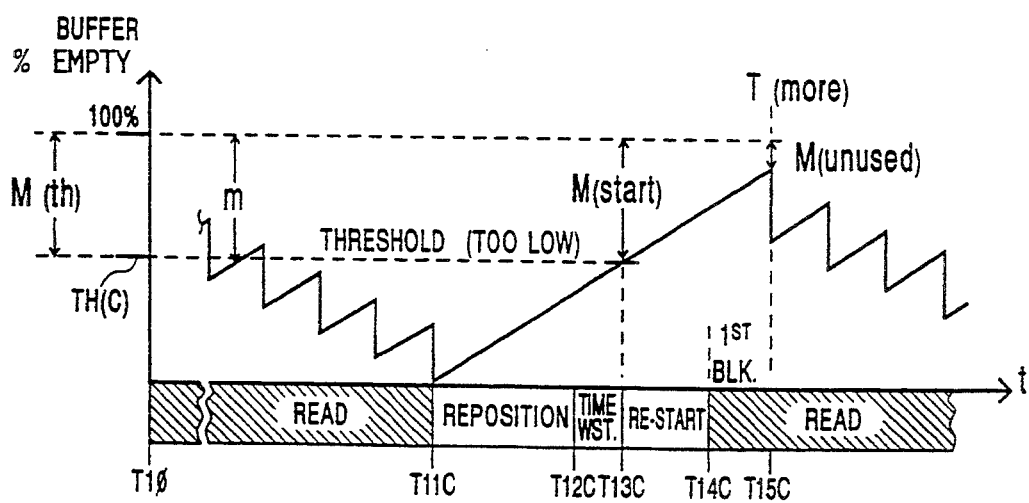
FIG. 6B is a diagram similar to that of FIG. 6A but for a second value of read-restart threshold.

FIG. 5 is a diagram similar to that of FIG. 2 showing tape position as a function of time during a data reading phase in which data is being read off the tape at a transfer rate faster than that at which it is being sent to the host requesting the data. More particularly, in time period T10 to T11 the tape is being advanced at a constant speed and dam is being read off into the data buffer 20. At time T11 the data buffer becomes full (in the sense that there is inadequate space to hold a further data block on the tape); at this time the current read operation is terminated and the tape repositioned for a subsequent such operation (period T11 to T12). The tape is then stopped and time wasting effected for a period T12 to T13. In due course a new read operation is instigated at time T13 and the tape is accelerated to reading speed and positioned such that the next data to be read follows on from that last read. At the time T14 data reading recommences; at time T15 a first block of data has been read from the tape and is available for transfer to the host. The time interval T14 to T15 will generally be greater than the time interval T4 to T5 in FIG. 2 since the time necessary to free up a block of data during data writing is simply the time needed to write this block to tape whereas the time needed to provide a block worth of dam ready for output during data reading is the time needed to read this data from the tape plus any extra time needed to process this data ready for sending out—in the present example, this processing includes processing carried out by the control processor 14. FIGS. 6A and 6B show the state of the buffer memory 20 during a data reading and correspond to FIGS. 3B and 3C respectively. However, it should be noted that the ordinate axis in FIGS. 6A and 6B represent the amount of buffer memory not occupied by data ready for transfer to the host rather than the amount of buffer memory occupied by data received from the host as in the case in FIGS. 3B and 3C.

In FIGS. 6A and 6B, whilst data is being read from the tape (period T10 to T11 and period T14 onwards) the amount of memory not occupied by data ready to send to the host decreases in steps corresponding to the size of the blocks transferred from the tape. As before the effect of transfer of data between the drive and the host is shown by a continuously sloping line causing a continual increase in the amount of buffer memory not occupied by data ready to transfer to the host. In FIG. 6A, the threshold at which a new read operation is instigated is set too high so that the buffer becomes emptied of data ready to transfer to the host before additional such data is available from the tape. In FIG. 6B, the opposite situation is illustrated where the buffer threshold is set too low so that the buffer still has data ready for transfer to the host at time T15C when such data is made available from the tape.

In adaptively controlling the threshold used to instigate a new read operation, the same parameter m is monitored as for instigating a new data write operation. This parameter m is the amount of externally-useful memory, that is the amount of buffer memory 20 that holds data ready for transfer to the host. As for data writing, in the case of data reading the threshold is defined in terms of a particular value for the parameter m and the adaptive determination of the threshold value M(th) is effected using the same measurements of the parameter m and the time variable t as for data writing. Thus the relevant parameters are:

N(start)—the value of the externally-useful memory amount upon instigation of a new read operation;

M(unused)—the value of the externally useful memory amount m at time T15 when the first block read from tape during a new read operation is available for transfer up to the host;

T(none)—the point in time when no data is ready for transfer up to the host (this event may not occur);

T(more)—the point in time T15 when the first block read from tape during a new reading operation is ready for transfer to the host;

R(mean)—the mean rate of dam transfer from the tape drive to the host.

The process for adaptively determining successive values of M(th) during data reading is then the same as that for data writing and the control process 30 illustrated in FIG. 4 is applicable to both situations.

Figure 7:
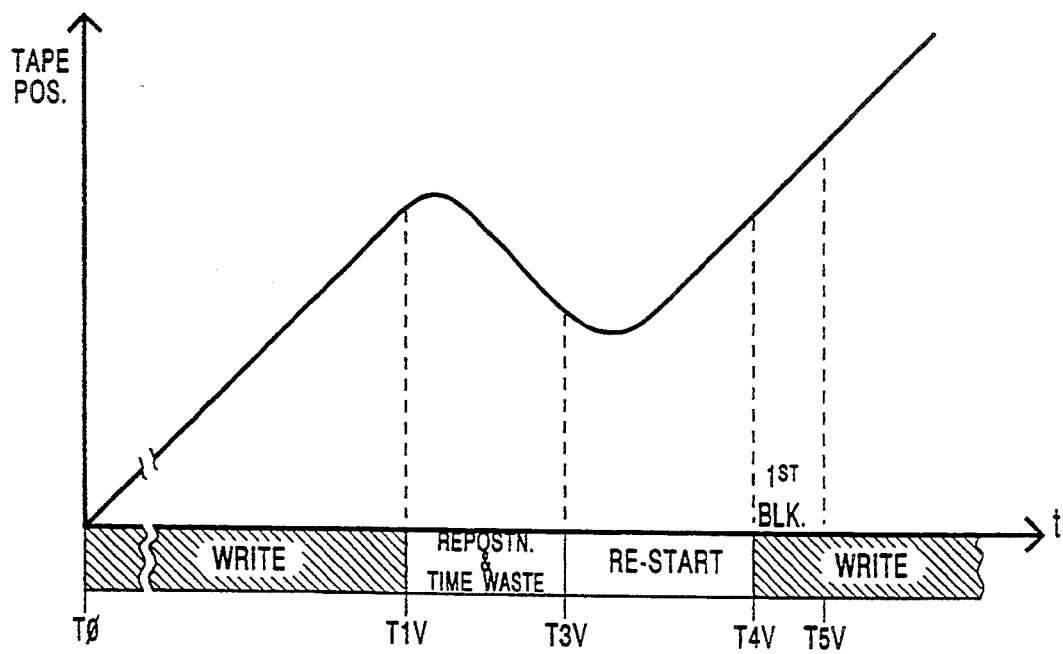
FIG. 7 is a time plot of tape position similar to that of FIG. 2 but with 'time wasting' being effected by reverse movement of the tape.
Figure 8:
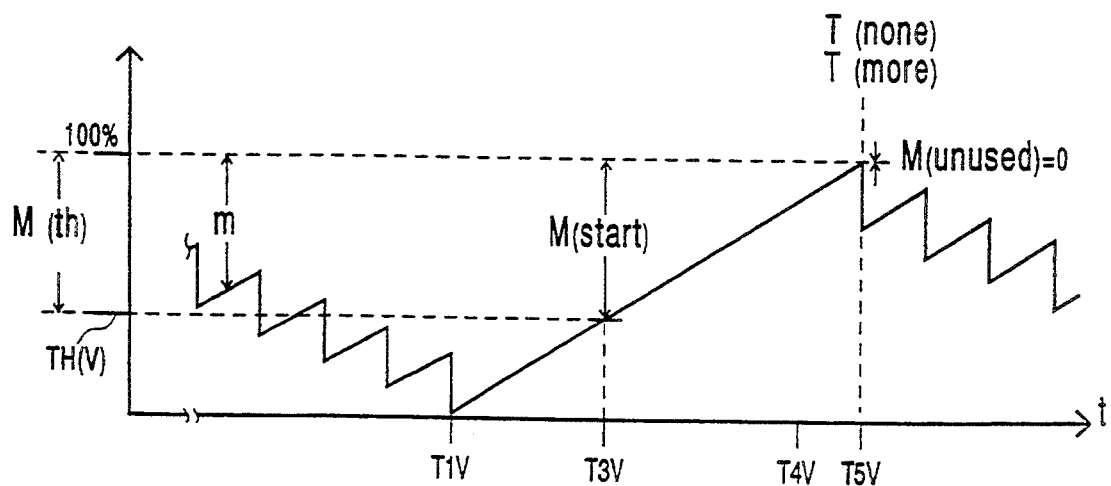
FIG. 8 is a time plot of buffer state during the period covered by FIG. 7.

The above described method for adaptively determining the threshold level M(th) for instigating a new read or write operation is effective for variations in data transfer rate between the tape drive and the host and also for different transfer rates to/from tape. Furthermore, the method of adaptively setting the threshold will optimise the threshold where a different time wasting regime is used to that illustrated (in FIGS. 2, 3, 5 and 6 time wasting is effected by stopping the tape deck upon the tape having been repositioned ready for a restart). Thus the adaptive control method is still effective where time wasting is carried out by continuing to reverse the tape past the position at which it is stopped at time T1/T11 at FIGS. 2 and 5 respectively, the tape only being moved forward upon instigation of a new read/write operation. This case is illustrated in FIGS. 7 and 8 and, as can be seen, repositioning and time wasting now takes place over a time period T1V to T3V the new read/write operation being instigated at time T3V whereupon the tape is moved forward and a new read/write operation is commenced at time T4 starting again where the previous operation left off. In order to achieve ideal operation, the threshold M(th) will generally need to be set at a different level to that required where a different time wasting regime is employed. FIG. 8 illustrates the threshold set at a value producing ideal operation and, as can be seen, the parameters used in the above-described adaptive threshold setting process will capture any relevant effect on buffer utilisation caused by a different time wasting regime. The adaptive threshold setting process described is therefore able to move the threshold towards an ideal setting.

It will be appreciated that the time wasting process illustrated in FIG. 7 can, in fact, be used independently of the method used to set the threshold that triggers a new read/write operation. The time wasting regime illustrated by FIG. 7 has the advantage that it does not require the tape deck 9 to stop which is usually desirable because stopping the deck normally causes more wear on mechanical parts than a controlled reversal of tape movement direction. It should also be noted that whilst in FIG. 7 the speed at which the tape is moved backwards is illustrated as being the same as the speed at which it is moved forward for reading and writing, this is not necessarily the case and fast or slow speeds can be used.

We claim:

1. A data storage method of transferring data between a storage medium and means coupled to a data storage apparatus, the method being performed with a data storage apparatus including a buffer memory, said method comprising:

a) transferring data between said storage apparatus and said means coupled thereto,
   b) storing data in said buffer memory,
   c) transferring data between said buffer memory and said storage medium in successive transfer operations each of which comprises a preparatory phase setting up conditions for data transfer, and a transfer phase in which data are transferred substantially continuously, performing the data transfer of step (c) in a controlled direction, performing steps (a), (b) and (c) in a controlled sequence, controlling the direction of the data transfer of step (c) and the sequence of steps (a), (b) and (c) for any given data item as a function of whether data are being written to, or read from, the storage medium; an amount of said buffer memory ready to be used in the transfer process of step (a) defining an externally-useful memory amount which, for data writing, is an amount of said buffer memory free to receive data and which, for data reading, is an amount of said buffer memory with data to be transferred from the apparatus;

instigating each transfer operation of step (c) in response to said externally-useful memory amount dropping below a threshold value;

measuring the following parameters of memory utilization, where they exist, during a previously-initiated step (c) transfer operation;

a waiting time during which said externally-useful memory amount is substantially zero;

remaining externally-useful memory amount present when said previously-initiated step (c) transfer operation first results in said externally-useful memory amount increasing;

using the waiting time which is measured as non-zero to determine adaptively said threshold value to minimize said waiting time, and using said remaining externally-useful memory amount which is measured as non-zero to determine adaptively said threshold value to minimize a remaining said externally-useful memory amount present when an increase in said externally-useful memory amount is about to occur for a first time following instigation of a step (c) transfer operation, to minimize step (c) transfer operations in number.

2. The method of claim 1 wherein the data are transferred between said buffer memory and said storage medium in whole blocks, measuring said waiting time as the time between said externally-useful memory amount becoming substantially zero and the time when a newly-initiated step (c) transfer operation has transferred a first one of said blocks to increase said externally-useful memory amount.

3. The method of claim 1 wherein the data are transferred between said buffer memory and said storage medium in whole blocks, measuring said remaining externally-useful memory amount as said previously-initiated step (c) transfer operation is completing transfer of a first of said blocks to increase said externally-useful memory amount.

4. The method of claim 1 further including using a control function to determine said threshold value when a determination thereof is derived by utilizing the measured said waiting time and using the same control function when said determination is derived by utilizing the measured said remaining externally-useful memory amount, combining one of these measured quantities with a measurement of mean data transfer rate achieved in step (a) to provide a quantity with the same dimensional units as the other of these measured quantities.

5. The method of claim 4 wherein said control function is of the form $$M(th) = M(start) - KE$$

where:
M(th) = the threshold value expressed in terms of said externally-useful memory amount;
M(start) = the value of said externally-useful memory amount when said step (c) is instigated;
K = a constant
E = said measured waiting time expressed as a negative value, or said measured remaining externally-useful memory amount, as appropriate.

6. The method of claim 5 wherein said control function further includes a constant added to the value M(start) to bias operation towards minimizing said waiting time.

7. The method of claim 1 wherein said storage apparatus is a tape drive.

8. Data storage apparatus for transferring data between a storage medium and means coupled to said data storage apparatus, said apparatus comprising:

a buffer memory;

interface means for transferring data between the buffer memory and the means coupled to said data storage apparatus;

storage-media transfer means for transferring data between the buffer memory and the storage medium in successive transfer operations each of which comprises a preparatory phase in which the transfer means is set up for data transfer and a transfer phase in which data are transferred substantially continuously; and control means for coordinating operation of the interface means, the buffer memory and the transfer means for at least one of reading data from said storage medium and writing data to said storage medium, any given item of data passing through said interface means, buffer memory and transfer means in an order dependent on whether data are being written to, or read from, said storage medium;

an amount of the buffer memory ready to be used in data transfer by said interface defining an externally-useful memory amount which, for data writing, is an amount of the buffer memory free to receive data and which, for data reading, is an amount of the buffer memory with data to be transferred from the storage apparatus;

the control means instigating a transfer operation by said storage-media transfer means in response to said externally-useful memory amount decreasing below a threshold value; said control means including measuring means for measuring the following parameters of memory utilization, where they exist, during a previously-initiated transfer operation of said transfer means;

a waiting time, during which said externally-useful memory amount is substantially zero;

remaining externally-useful memory amount present when said previously-initiated transfer operation first results in said externally-useful memory amount increasing;

and said control means further including adaptive threshold determining means operative for (i) using the waiting time which is measured as non-zero to determine adaptively said threshold value to minimize said waiting time, and (ii) using said remaining externally-useful memory amount which is measured as non-zero to determine adaptively said threshold value to minimize a remaining said externally-useful memory amount present when an increase in said externally-useful memory amount is about to occur for a first time following instigation of a transfer operation of said transfer means to minimize the transfer operations of said transfer means in number.

* * * * *

UNITED STATES PATENT AND TRADEMARK OFFICE
CERTIFICATE OF CORRECTION

PATENT NO. : 5,412,780
DATED : May 2, 1995
INVENTOR(S) : Nigel RUSHTON

It is certified that error appears in the above-indentified patent and that said Letters Patent is hereby corrected as shown below:

Column 2, line 48, change "Co)" to --(b)--.
Column 11, line 20, change "dam" to --data--.
Column 11. line 63, change "N(start)" to --M(start)--.
Column 12, line 6, change "dam" to --data--.

Signed and Sealed this

Third Day of September, 1996

Attest:

BRUCE LEHMAN

Attesting Officer

Commissioner of Patents and Trademarks